Feb. 27, 1940.  W. H. MARSH  2,191,766
COMPENSATED REGISTER DRIVE
Original Filed July 31, 1935  2 Sheets-Sheet 1
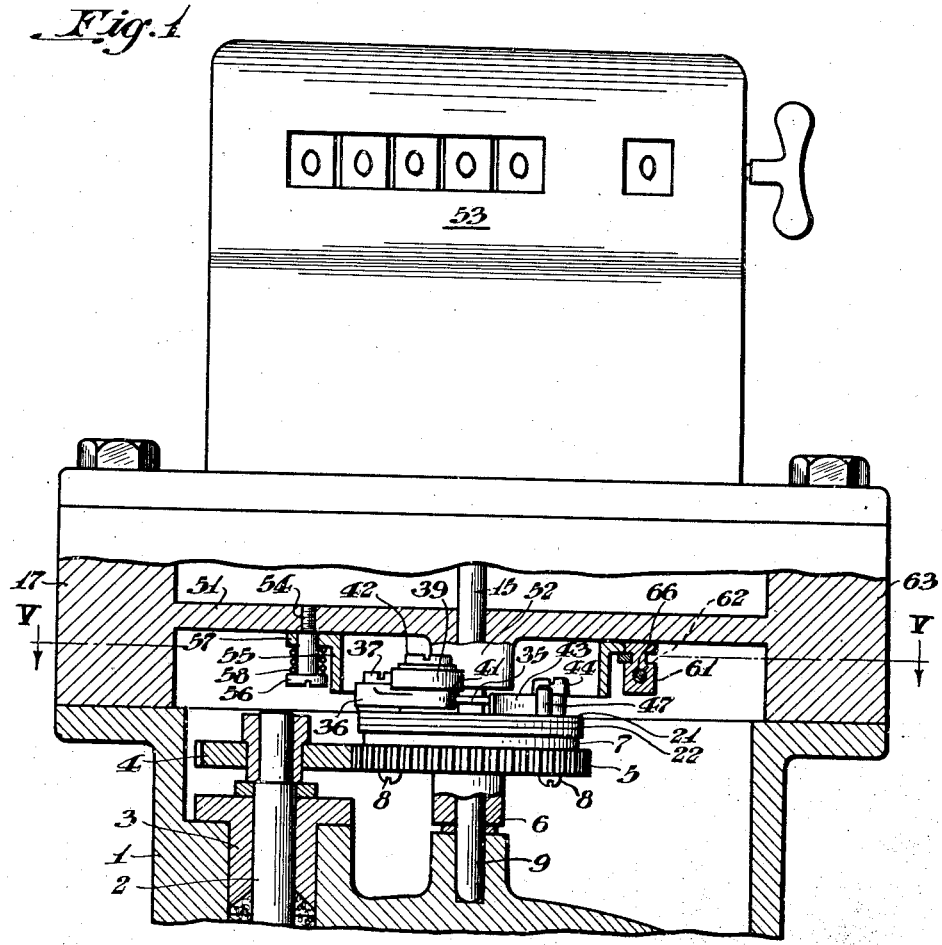
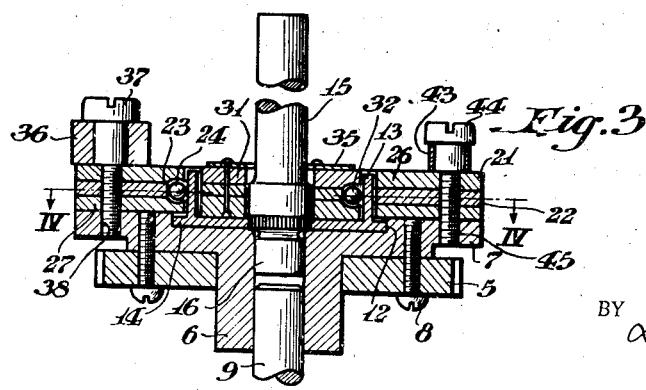
INVENTOR.
Walter H. Marsh.
BY Lewis D. Konigsford
ATTORNEY.

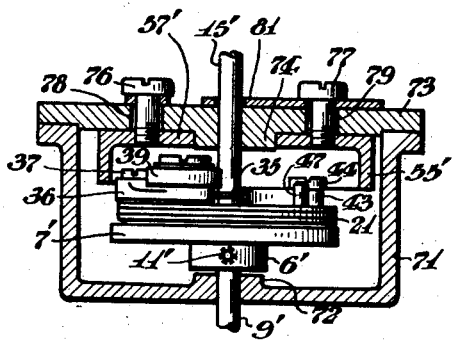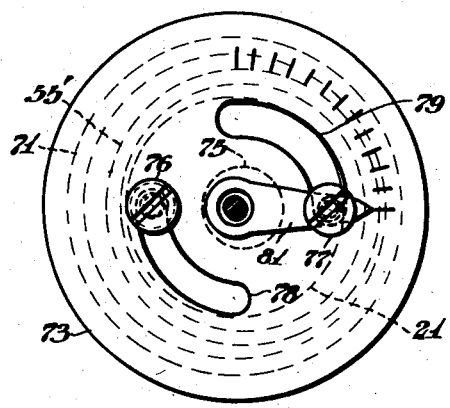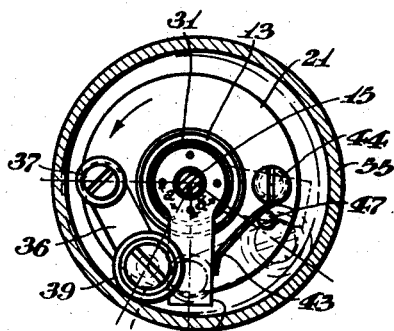

Patented Feb. 27, 1940

2,191,766

UNITED STATES PATENT OFFICE 2,191,766

COMPENSATED REGISTER DRIVE

Walter H. Marsh, Crafton, Pa., assignor to Pittsburgh Equitable Meter Company, Pittsburgh, Pa., a corporation of Pennsylvania Application July 31, 1935, Serial No. 34,046
Renewed July 10, 1939

15 Claims. (Cl. 74—112)

This invention relates to a movement transmission mechanism for varying the driving ratio between a driving shaft and a driven shaft.

One object of my invention is to provide a variable movement transmission mechanism which is very accurate and can be adjusted with precision and which can be sealed against tampering when in adjusted position.

Another object is the provision of a transmission which cannot drive the driven shaft in the reverse direction when the direction of rotation of the driving shaft is reversed.

Another object is the provision of an adjustable drive embodying a micrometer adjustment for varying the driving ratio between two shafts.

Still another object is the provision of a temperature compensating adjustment to vary the driving relation between two shafts.

A further object is the provision of a transmission mechanism which is inexpensive to manufacture, adjustable and accurate, and can be readily adapted to various types of devices now commercially available.

According to the present invention, a plurality of one way drive means are provided for driving a driven shaft or the like in one direction, said shaft receiving a periodical overdrive through the one way drive means from a member guided in a track surrounding said shaft. The track is adjusted in various eccentric positions by a micrometer adjustment. In the preferred embodiment an arm is secured to a secondary one way clutch and an abutting link driven from a primary one way clutch drives said arm and is gradually moved with a radially inward and outward component of movement to change the angular velocity of said arm. In one direction of radial movement of said link the rotation of the secondary clutch is accelerated, and in the opposite direction of radial movement the rotation of the secondary clutch is decelerated, the one way drive, however, permitting such deceleration of the secondary clutch while the shaft continues to be driven by the primary clutch. If desired, the position of said track may be adjusted by a temperature responsive element. Should the direction of rotation of the driving shaft be reversed, the driven shaft will not be driven by either the primary or the secondary clutches.

For a further detailed description of the invention reference is had to the accompanying drawings, taken in connection with the following specification, in which:

Figure 1 is a view partly in section of a preferred embodiment of my invention;

Figure 2 is a plan view of Figure 1 on a reduced scale;

Figure 3 is a vertical section on an enlarged scale of the double one way clutch assembly;

Figure 4 is a horizontal section of the double one way clutch assembly taken on line IV—IV of Figure 3, the primary clutch being disengaged;

Figure 5 is a sectional view taken on line V—V of Figure 1 of the double one way clutch assembly and adjustment, the casing not being shown;

Figure 6 is a view partly in section of a modification; and

Figure 7 is a plan view of Figure 6.

Referring to the drawings in Figure 1, there is shown a fragmentary section of a case 1 having a driving shaft 2 passing through a stuffing box 3, a driving pinion 4 being suitably mounted on the end of the shaft. The pinion 4 drives a spur gear 5. The gear 5 fits over the hub 6 of a table 7 and is secured to the table by machine screws 8 or any other suitable means. The table 7 and gear assembly is loosely rotatable on a stub shaft 9 which is suitably journalled in the casing.

The table 7 has a central depression 12 which receives a clutch drum having a cylindrical clutch wall 13 and a circular head 14 to which is secured the enlarged fluted end of driven shaft 15, a stub 16 thereof extending into and being loosely journalled in hub 6. The other end of shaft 15 is journalled in any suitable manner in an intermediate plate 17. The table 7 carries an exterior or primary one way grip clutch designated generally by the numeral 21, which is secured thereto by screws 37 and 44. The clutch is constructed in any suitable manner, and in the preferred embodiment comprises an annular middle disk 22 having tangential recesses 23 in its inner periphery in which are located steel balls 24 urged inwardly by springs 25 in the recesses. The balls and springs are covered by two similar annular cover plates 26 and 27, which are riveted or otherwise secured to the middle plate 22, and have turned in portions 28 which prevent the balls 24 from falling out of the recesses. The arrangement is such that when the primary clutch turns counterclockwise as seen in Figure 4, the balls 24 will grip the drum 13 so that the drum and shaft 15 will rotate in unison with clutch 21.

Within the drum 13 is a secondary similar one way clutch assembly designated generally by the numeral 31 and similarly constructed with balls 32 received in the tangential recesses 33 and 34 urged outwardly by springs 34. The secondary clutch assembly 31 is freely rotatable on the driven shaft 15, and the arrangement of recesses therein is such that when the drum 13 is driven by the outer clutch 21 the clutch drum 13 idles over the balls 32 of the secondary clutch.

A compensator arm 35 is riveted or otherwise secured to secondary clutch assembly 31 and is rotatable therewith about driven shaft 15. A driver link 36 is pivotally secured at one end to primary clutch 21 by a shouldered screw 37 threaded into a suitable threaded bore 38 in the table 7, and an enlarged roller 39 is carried at the other end 41 of this link. The roller is secured to the top of the link 36 by a shouldered screw 42 with a suitable anti-friction washer interposed between the roller and head of the screw, and the rounded end 41 of the link engages the compensator arm 35. A spring 43 is coiled about a shouldered screw 44 threaded into a bore 45 in the table 7, and urges the link and compensator arm into contact, and a pin 47 threaded into a suitable bore 48 in the table 7 serves as a fulcrum to flex the spring.

The spring 43 urges the compensator arm 35 against the rounded end 41 of the link 36 thereby urging the link 36 outwardly to maintain roller 39 at all times in engagement with circular track 55. When the track 55 is concentric with the axis of driven shaft 15 the roller 39 moves in a path concentric with the shaft 15 as shown by the dot and dash line, and therefore, as the primary clutch 21 rotates, the screw 37, which is the pivot point of link 36, the center of shaft 15, and the contact point of roller 39 with track 55 will form a constant angle, designated as $a$. Under this condition, the outer clutch 21 will rotate clutch drum 13 and will rotate inner clutch 31 by the pushing action of link 36 on arm 35 at the same speed, so that there is no relative angular movement between outer clutch 21 and inner clutch 31.

The intermediate plate 17 secured to the top of meter case 1 (Figures 1 and 2) has a central wall 51 with a central boss 52 in which driven shaft 15 is journalled, the shaft 15 directly driving a device 53 of any suitable construction or by the interposition of suitable gearing. The central wall has a threaded bore 54, and a movable circular track 55 is secured thereto by a shouldered screw 56 passing through a suitable bore in the flange 57 of the track into the bore 54, a spring 58 being interposed between the head of the screw and the flange to keep the track pressed against the central wall. Diametrically opposite a lug 61 is suitably swivelly secured in a slot in the flange 57, the lug having a threaded bore 62 therethrough.

The thickened rim portion 63 of the intermediate plate has a horizontal threaded bore 64 and a threaded counterbore 65 therein. An adjustment rod 66, having a kerf at its end is threaded into the hole 62 in the lug 61, and is threaded for a part of its length extending through the bore 64. These threads are of different pitch so that a micrometer adjustment is secured. This rod is preferably made of brass or other material having a high expansion coefficient if it is desired to utilize temperature compensation. A plug 68 is located in counterbore 65 and is provided with a hole therethrough for reception of a wire and lead seal.

The operation will now be described. Referring to Figure 5, the track 55 has been moved eccentrically to shaft 15, and from the known geometrical theorem that two circles intersect in two points, it will be apparent that two points on the circumference of eccentric track 55 as shown will coincide with two points concentric with shaft 15. The roller 39 is shown in contact at one such point of coincidence. As the clutch 21 moves in the direction of the arrow the screw 37 will be moved to the position shown in dot and dash lines, and the roller 39 will take the position shown in dot and dash lines in contact with track 55. Because roller 39 has moved radially outward the compensator arm 35 will have been moved angularly by spring 43 toward screw 37, and the angle $a'$ subtended by the chord between screw 37 and contact point of roller 39 on track 55 will become smaller. Thus, the speed of primary clutch 21 will not change, but the angular speed of secondary clutch 31 will have been reduced by an amount equal to the difference between angles $a$ and $a'$. This difference in speed is allowed by clutch drum 13 slipping over the secondary clutch balls 32 as the springs 33 yield.

This action will continue until the point of greatest eccentricity of track 55 is reached. Thereafter, the angle $a'$ starts to increase, and as it increases the secondary clutch 31 is driven at a greater speed than primary clutch 21. During this part of the cycle the clutch drum 13 is driven by secondary clutch 31 at a greater angular speed than primary clutch 21, this difference in speed being allowed by drum 13 slipping over the balls 24 as the springs 25 yield. Thus it will be seen that in each revolution of the apparatus the clutch drum 13, to which driven shaft 15 is secured, is given an overdrive only for a part of its revolution, and by suitably adjusting the eccentricity of track 55 this overdrive can be adjusted to cause the device 53 to be driven in exact corespondence with the rotation of driving shaft 2. The adjustment of track 55 is made by rotating the micrometer threaded adjusting rod 66 to pivot the track about the screw 54 as a pivot. As viewed in Figures 2 and 5, when the track is in the position shown, adjusted off center, the thermal expansion of rod 62 will move the track toward center so that a compensation for temperature change is effected.

Upon reversal of shaft 2, direction of rotation of gear 5 and of primary clutch 21 will be reversed, and the drum 13 will not be driven from the primary clutch because of slippage of balls 24 thereof over the drum surface. Clutch 21 will drive link 36 in the reverse direction from the arrow shown in Figure 5, and spring 43 will cause arm 35 to follow link 36 in contact therewith. Thus, arm 35 will rotate secondary clutch 31 in reverse direction and the shaft 15 and clutch drum 13 will not be rotated due to slippage of balls 32 thereof. Hence, shaft 15 cannot be driven in reverse direction.

In the modification shown in Figures 6 and 7, the compensator mechanism and its principle of operation are similar to that shown in Figures 1 to 5, and the manner in which the mechanism is driven and is secured to the casing, and the manner of securing and adjusting the track are different on this modification. The compensator mechanism is enclosed in a housing 71. The housing 71 has a thickened bearing portion 72 in which is journalled a drive shaft 9'. A table 7' is secured to the shaft 9' by a set screw 11' passing through the collar 6' and carries a primary one way clutch 21, a clutch drum 13, and a secondary one way clutch 21 as previously described, the driven shaft 15' being secured to the clutch drum 13.

The housing 71 is closed by a cover 73 suitably secured thereto which has an eccentric hub 74 with a concentric bore therethrough in which one end of shaft 15' is journalled. A track member 55' in the form of an inverted cup has a head 57' in which is eccentrically located a circular bore 75 in which the eccentric hub 74 is received. The track is held in position by shouldered screws 76 and 77 threaded into the head 57' and passing through eccentric slots 78 and 79 in the cover 73. A pointed indicator 81 is loosely swivelled on shaft 15' and the screw 77 passes therethrough adjacent its outer end, the cover being graduated to cooperate with the pointed indicator.

In this modification the shaft 9' is driven and rotates the table 7' therewith, the table 7' carrying exactly the same parts as table 7. The roller 39 engages the interior of track 55' and when track 55' is concentric with shaft 15' the shaft 15' is driven at the same speed as shaft 9'. The track 55' can be rotated eccentrically by releasing screws 76 and 77 and rotating the pointer 81 which cooperates with the graduations to show the degree of eccentricity of the track 55' with relation to shaft 15', and thereby shows the extent of compensation in the drive.

The invention may be embodied in other specific forms without departing from the spirit or essential characteristics thereof. The present embodiment is therefore to be considered in all respects as illustrative, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. In a compensated drive, a driving shaft, a driven member, a primary one way clutch member operated by said driving shaft to rotate said driven member in one direction for a portion of its cycle rotation, a secondary one way clutch member to grip said driven member when turned in one direction at a greater speed than the primary one-way clutch, an arm connected to said secondary clutch member, a guiding track providing an orbit with its axis displaced with respect to the axis of the driving shaft, and means actuated by the driving shaft contacting said arm and guided by said track.

2. In a compensating drive, a driving shaft, a clutch drum, a driven shaft secured thereto, a primary one way ball clutch operated by said driving shaft to rotate said clutch drum in one direction, a secondary one way ball clutch within said drum to grip said drum when turned in one direction at a greater speed than the primary one-way ball clutch, an arm connected to said secondary clutch, a guiding roller pivotally linked to said primary clutch and yieldingly engaging said arm, a track surrounding said clutch for guiding said roller, and means for adjusting the eccentricity of said track.

3. In a compensating drive, a driving shaft, a clutch drum, a driven shaft secured thereto, a primary one way ball clutch operated by said driving shaft to rotate said clutch drum in one direction, a secondary one way ball clutch within said drum to grip said drum when turned in one direction at a greater speed than the primary one-way ball clutch, an arm connected to said secondary clutch, a link pivotally secured to said primary clutch at one end and carrying a roller at its other end and abutting said arm, a track surrounding said clutches, a leaf spring urging said arm and link into contact and said roller against said track, and means to adjust the eccentricity of said track.

4. In a compensating drive, a casing, a driving shaft, a clutch drum, a driven shaft secured thereto, a primary one way ball clutch operated by said driving shaft to rotate said clutch drum in one direction, a secondary one way ball clutch within said drum and adapted to grip said drum when turned in one direction at a greater speed than the primary one-way ball clutch, an arm connected to said secondary clutch, a link pivotally secured to said primary clutch at one end and carrying a roller at its other end and abutting said arm, a track surrounding said clutches, a leaf spring urging said arm and link into contact and said roller against said track, and an adjusting rod extending through said casing for adjusting the eccentricity of said track.

5. In a compensating drive, a casing, a driving shaft, a clutch drum, a driven shaft secured thereto, a primary one way clutch operated by said driving shaft to rotate said clutch drum in one direction, a secondary one way clutch within said drum and adapted to grip said drum when turned in one direction at a greater speed than the primary one-way clutch, an arm connected to said secondary clutch, a link pivotally secured to said primary clutch at one end and carrying a roller at its other end and abutting said arm, a track surrounding said clutches, means urging said link and arm in abutting relation and said roller against said track, and an adjusting rod with micrometer adjustment for varying the eccentricity of said track.

6. In a compensating drive, a driving shaft, a driven shaft, primary means operated by said driving shaft, one-way drive means carried by said primary means to rotate said driven shaft in unison therewith in one direction and disengageable from the driven shaft to permit relative movement between said primary means and driven shaft, an eccentric track, means guided by said track for periodically imparting an overdrive impulse to said driven shaft, and a differential screw adjustment for varying the eccentricity of said track.

7. The combination comprising a stationary casing, a driving shaft, a driven shaft, means rotated by the driving shaft and having a driving engagement with the driven shaft, an orbit mounted on the stationary casing and having its axis displaced with respect to the axis of the driving shaft, one way driving means actuated by said orbit for imparting an impulse drive to said driven shaft, temperature responsive means for adjusting the axis of said orbit to vary the extent of impulse drive.

8. In a compensating drive, a driving shaft, a driven member, a primary one-way clutch member operated by said driving shaft to grip said driven member when rotated in one direction, a secondary one-way clutch member to grip said driven member when turned in the same direction as the primary clutch member, an arm connected to said secondary clutch member, a guiding track, and means actuated by the driving shaft and guided by said track to periodically advance and retract the secondary one-way clutch member.

9. In a compensating drive, a driving shaft, a driven member, a primary one-way clutch member operated by said driving shaft to grip said driven member when rotated in one direction, a secondary one-way clutch member to grip said driven member when turned in the same direction as the primary clutch member, an arm connected to said secondary clutch member, a track surrounding said clutch members, a link pivotally mounted on the primary clutch member, the outer end of said link being guided by said track and abutting said arm, means for maintaining said arm and link in abutting contact, and means to adjust the eccentricity of said track.

10. In a compensating drive, a driving shaft, a driven member, a primary one-way clutch member operated by said driving shaft to grip said driven member when rotated in one direction, a secondary one-way clutch member to grip said driven member when turned in the same direction as the primary clutch member, an arm connected to said secondary clutch member, a track surrounding said clutch member, a link pivotally mounted on the primary clutch member, the outer end of said link being guided by said track and driving said arm, means for maintaining said arm and link in abutting contact, and means to adjust the eccentricity of said track.

11. In a compensating drive, a driving shaft, a primary one-way clutch member having its driving element positively connected to said shaft, a secondary one-way clutch member having a driving element, said clutches including a common element positively driven in one direction, a driven shaft positively connected to said common element, an extension secured to the driving element of the secondary clutch member, a circular track surrounding the primary clutch member, an arm pivotally secured to the driving element of the primary clutch member guided by said track to drive said extension, and means for displacing said track eccentric to said clutch driving element.

12. In a compensating drive, a driving shaft, a driven member, a primary one-way ball clutch member operated by said driving shaft to grip said driven member when rotated in one direction, a secondary one-way clutch member to grip said driven member when turned in the same direction as the primary one-way ball clutch member, an arm rigidly connected to said secondary clutch member, a circular track surrounding said clutch member, a link pivotally mounted at one end on the primary clutch member, the other end of said link carrying a roller and abutting said arm, a spring for maintaining said arm and link in abutting contact and maintaining said roller against said track and means to adjust the eccentricity of said track.

13. In a compensating drive, a driving shaft, a driven member, a primary one-way clutch operated by said driving shaft to grip said driven member when rotated in one direction, a secondary one-way clutch to grip said driven member when turned in the same direction as the primary one-way clutch, an arm connected to said driving shaft contacting said arm and guided by said track, and a micrometer adjustment to vary the eccentricity of said track.

14. In a compensating drive, a driving shaft, a driven member, a primary one-way clutch operated by said driving shaft to grip said driven member when rotated in one direction, a secondary one-way clutch to grip said driven member when turned in the gripping direction of the primary one-way clutch, an arm connected to said secondary clutch, a guiding track, a member actuated by the driving shaft contacting said arm and guided by said track, and a temperature responsive means for varying the eccentricity of said track.

15. In a compensating drive, a driving shaft, a driven shaft, a primary one-way clutch member operated by said driving shaft to rotate said driven shaft in one direction for a portion of its cycle of rotation, a secondary one-way drive member to rotate said driven shaft when turned in the driving direction of the primary one-way clutch member and at a greater speed, a stationary guiding track, means actuated by the driving shaft guided by said track, and means connecting said last mentioned means with the secondary one-way drive member.

WALTER H. MARSH.